(12) United States Patent
Milanesi et al.

(10) Patent No.: US 11,272,583 B2
(45) Date of Patent: Mar. 8, 2022

(54) INDUCTION COOKING HOB AND METHOD FOR CONTROLLING A COOKING ZONE

(71) Applicant: ELECTROLUX APPLIANCES AKTIEBOLAG, Stockholm (SE)

(72) Inventors: Filippo Milanesi, Forli (IT); Alex Viroli, Forli (IT); Laurent Jeanneteau, Forli (IT); Massimo Nostro, Forli (IT); Fabio Angeli, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 408 days.

(21) Appl. No.: 16/329,283

(22) PCT Filed: Aug. 28, 2017

(86) PCT No.: PCT/EP2017/071519
§ 371 (c)(1),
(2) Date: Feb. 28, 2019

(87) PCT Pub. No.: WO2018/041767
PCT Pub. Date: Mar. 8, 2018

(65) Prior Publication Data
US 2019/0254125 A1    Aug. 15, 2019

(30) Foreign Application Priority Data

Sep. 2, 2016  (EP) ..................... 16186967
Mar. 8, 2017  (EP) ..................... 17159796

(51) Int. Cl.
*H05B 6/12* (2006.01)
*H05B 6/06* (2006.01)

(52) U.S. Cl.
CPC ........... *H05B 6/1272* (2013.01); *H05B 6/065* (2013.01); *H05B 2213/03* (2013.01); *Y02B 40/00* (2013.01)

(58) Field of Classification Search
CPC .. H05B 6/065; H05B 6/1272; H05B 2213/03; Y02B 40/00; Y02B 40/126
USPC ....... 219/672, 620, 621, 622, 624, 665, 671, 219/626, 627
See application file for complete search history.

(56) References Cited

U.S. PATENT DOCUMENTS

2011/0147375 A1    6/2011  Lomp
2013/0284722 A1*  10/2013  Viroli .................... H05B 6/065
                                                                     219/622

FOREIGN PATENT DOCUMENTS

| CN | 103574706 | 2/2014 |
| CN | 104604328 | 5/2015 |
| DE | 102004003126 A1 | 8/2005 |
| EP | 2034799 | 3/2009 |

(Continued)

OTHER PUBLICATIONS

International Search Report and Written Opinion issued in corresponding PCT application No. PCT/EP2017/071519 dated Nov. 27, 2017, 11 pages.

(Continued)

*Primary Examiner* — Quang T Van
(74) *Attorney, Agent, or Firm* — Pearne & Gordon LLP

(57) ABSTRACT

An induction cooking hob includes a control unit and at least one cooking zone. The cooking zone includes at least three induction coils. At least one first group of one or more induction coils and at least one second group of two or more induction coils of the at least one cooking zone are alternatingly activatable or activated by a control unit.

25 Claims, 6 Drawing Sheets

(56) References Cited

FOREIGN PATENT DOCUMENTS

| EP | 2405715 | A1 | 1/2012 |
|----|---------|----|--------|
| EP | 2840867 | A1 | 2/2015 |
| EP | 2914059 |    | 9/2015 |
| EP | 2925088 | A1 | 9/2015 |
| JP | 2012079581 | A | 4/2012 |

OTHER PUBLICATIONS

English translation of Chinese Office action for application No. 201780052974.6 dated Jun. 25, 2021, 8 pages.
EP communication for application No. EP 17159796.6 dated Sep. 29, 2021, 7 pages.

\* cited by examiner

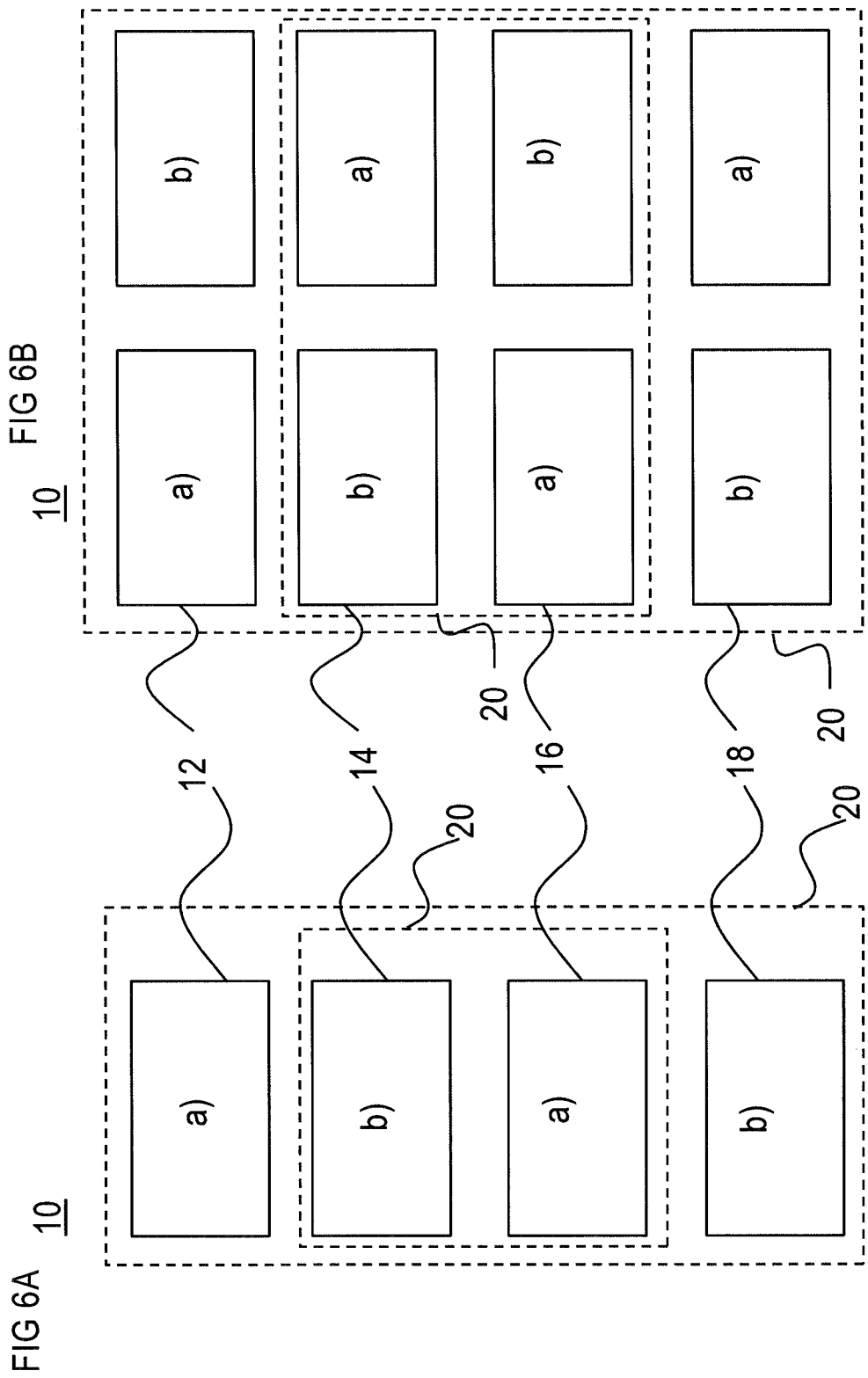

INDUCTION COOKING HOB AND METHOD FOR CONTROLLING A COOKING ZONE

The present invention relates to an induction cooking hob comprising at least one cooking zone. Further, the present invention relates to a method for controlling a cooking zone of an induction cooking hob.

On an induction cooking hob at least one cooking zone may be formed, each by one or more induction coils. Thereby a combination of at least two more adjacent induction coils allows a flexible arrangement of such cooking zones. For example, an induction-cooking hob with a large number of relative small induction coils allows that the cooking zone(s) may be adapted to the size and/or intended placement of one or more cooking vessels.

However, an acoustic noise may occur by interference of adjacent induction coils, when said adjacent induction coils have different working frequencies.

It is an object of the present invention to provide an induction-cooking hob comprising at least one cooking zone, which avoids an occurrence of acoustic noise.

Preferred embodiments may be taken from the following description, in particular comprising various embodiments as covered and described in the annexed claims.

The embodiments, features and combination of features as described herein in connection with the invention, as well as the combination of features as given in the annexed claims, but also any combination of features as mentioned and described in connection with the embodiments shall be considered as being disclosed herein, at least, however, shall be considered to be derivable by the skilled person.

In particular, each feature and each combination of features in the embodiments as described herein may for example be claimed in a different combination, in particular different claim category, at least because the skilled person will recognize that each and every combination of the features mentioned herein is suitable for contributing to solving the underlying problem.

Further, each feature and each combination of features in the claims and used in the description below may be used and claimed independently from the respective claimed subject matter, independently from claim dependencies and back-references, and independently from the claim category in which the feature is claimed. For example in an arbitrary combination selected from one or more claims, one or more embodiments as set forth herein below and/or from the annexed figures may be envisaged.

An induction cooking hob as disclosed herein comprises at least a control unit and at least one cooking zone. The cooking zone includes at least three induction coils, whereby a first group (a) of one or more induction coils, and at least one second group (b) of two or more induction coils of said at least one cooking zone are alternatingly activatable or activated by the control unit.

In a further embodiment, an induction cooking hob as disclosed herein comprises at least a control unit and at least one cooking zone. The cooking zone includes three, at least three, at least four, preferably four, five, at least five, six or at least six induction coils whereby a first group (a) of one or more induction coils, and at least one secondgroup (b) of two or more induction cils of said at least one cooking zone are alternatingly activtable or activated by the control unit.

The main idea of the present invention is that groups of inductions coils are activatable alternatingly. More advantageously, the inductions coils activated at the same time are arranged to have the maximum distance to each other. This avoids the occurrence of acoustic noise.

According to the main idea of the present invention induction coils which are arranged side by side or adjacent to each other which are not activatable or activated at the same time in order to avoid acoustic noise due to interference.

In a preferred embodiment, the induction coils defining one cooking zone are arranged as a two-dimensional matrix comprising a plurality of groups, preferably two groups of induction coils. Along each of the two directions of the matrix the induction coils of the different groups are arranged in an alternating manner such that an induction coil of a specific group is surrounded by induction coils of another group or other groups only, and wherein the groups of induction coils are alternatingly activatable or activated.

Four induction coils defining one cooking zone can be arranged as a two-by-two matrix and comprising a first group of two diagonally arranged induction coils and a second group of two diagonally arranged induction coils, wherein the first group of induction coils and the second group of induction coils are alternatingly activatable or activated. By means of this arrangement only diametrically opposed induction coils having a larger distance than induction coils of on single row or column are activated at the same time in order to reduce interference.

The above described problems are also advantageously solved by a method for controlling a cooking zone of an induction cooking hob as disclosed herein. Said method comprises at least the following steps:
a step a) of activating a first group (a) of induction coils of a cooking zone during a first time slot,
a step (b) of activating a second group (b) of induction coils.

It shall be noted, that the steps according to the present invention, particularly as given above, do not necessarily have to be carried out in the given order. The provided steps may be carried out in any other suitable order. However, the order as given above may apply for particular variants of the method.

It will be immediately acknowledged by a person skilled in the art that a feature, embodiment, effect or advantage described herein in connection with the inventive induction-cooking hob, may also be a feature, embodiment, effect or advantage of the inventive method, respectively, and vice versa.

According to an embodiment, the cooking zone of the induction hob according to the present invention includes at least three, particularly at least four, induction coils.

The term "group" of induction coils as used herein, preferably refers to one or more induction coils, which according to their assigned power level correspond to each other. Particularly, a group of induction coils may be one or more coils, which is activated or activatable at the same time. A "group of at least two groups" of induction coils as used herein, preferably refers to at least one group of induction coils comprising at least one induction coil, and at least one group of group of induction coils comprising at least two induction coils, wherein the at least two groups are alternatingly activatable or activated by the control unit. More preferably, a "group of at least two groups" of induction coils as used herein, refers to at least two groups of induction coils comprising each at least two induction coils, wherein the at least two groups are alternatingly activatable or activated by the control unit.

The term "activatable or activated" as used herein, preferably refers to the activation of the induction coil, upon supply of the induction coil with power.

The first group of induction coils may comprise only one or, alternatively, at least two induction coils, whereas the at least one second group of induction coils comprises two or alternatively more than two induction coils. Accordingly, a cooking zone according to the present invention comprises at least three induction coils assigned to at least two groups of induction coils, namely a first group comprising at least one induction coil and at least a second group comprising at least two induction coils.

However, according to embodiments a cooking zone according to the present invention may also comprise more than two groups of induction coils, particularly the cooking zone may comprise a first group of one or more induction coils, and at least one second group of two or more induction coils, and additionally at least one further group of one or more than one induction coils.

According to the present invention, a group of induction coils may also comprise more than two induction coils. Particularly a first group of induction coils may comprise at least one induction coil, at least two induction coils, at least three induction coils, at least four induction coils. Additionally or alternatively, a second group of induction coils may comprise at least two induction coils, at least three induction coils, or at least four induction coils. Accordingly, a cooking zone may comprise a first group of one induction coil and a second group of two induction coils, a first group of one induction coil and a second group of three induction coils, a first group of one induction coil and a second group of four induction coils, a first group of two induction coil and a second group of two induction coils, a first group of two induction coil and a second group of three induction coils, a first group of two induction coil and a second group of four induction coils, a first group of three induction coil and a second group of two induction coils, a first group of three induction coil and a second group of three induction coils, a first group of three induction coil and a second group of four induction coils, a first group of four induction coil and a second group of two induction coils, a first group of four induction coil and a second group of three induction coils, a first group of four induction coil and a second group of four induction coils, and so forth.

In particular, the three or at least three induction coils of the cooking zone of the induction cooking hob can be arranged in a column, row and/or array. Especially, an array or row of induction coils comprises at least three, at least four, preferably four, at least five or at least six induction coils.

In an embodiment, all or at least some of the induction coils are rectangular or oval shaped.

In a further embodiment, all or at least some of the induction coils are triangular shaped, in particular as isosceles triangles.

In an embodiment, three induction coils are arranged as an isosceles triangle.

In an embodiment, three or at least three induction coils are arranged concentrically.

In an embodiment, each coil has the same shape and size. In a further embodiment, each coil has different shapes and/or sizes.

In an embodiment, the cooking zone includes three or at least three oval induction coils arranged as an isosceles triangle.

In an embodiment, the cooking zone includes three circular induction coils arranged as an isosceles triangle. Especially, the cooking zone includes three triangular, preferably isosceles triangular, induction coils arranged as an isosceles triangle.

In an embodiment, the induction cooking hob comprises four, at least four, eight or at least eight triangular shaped induction coils forming triangles.

In a further embodiment, two triangles supplement each other to a square, and/or four triangles supplement each other to a rectangle and/or eight triangles supplement each other to at least one or at least two squares.

In particular, eight triangles complement each other to a larger outer square and a smaller inner square and/or four small squares.

Especially, the outer and the inner square are rotated to each other by 45°.

In an embodiment, the induction cooking hob comprises at least one cooking zone, wherein the triangles are combined to at least one small square and/or smaller square and/or outer square.

Especially, at least one or each of the generators comprises one, at least one, at least two or two IGBTs and/or the IGBTs operate as a full-bridge, half-bridge and/or as a quasi-resonant circuit.

In a preferred embodiment the induction coils of one group of induction coils are activatable or activated at the same time by the control unit. Particularly, the induction coils of the at least one second group of induction coils are activatable or activated at the same time by the control unit.

Preferably, the first group of induction coils and the second group of induction coils comprises more than one, i.e. at least two, induction coils. In such embodiment it is preferred that the induction coils of the first group of induction coils are activatable or activated at the same time by the control unit. Preferably, also the induction coils of the at least one second group of induction coils are activatable or activated at the same time by the control unit.

In a preferred embodiment of the induction-cooking hob according to the present invention each of the induction coils of the cooking zone are assigned to different induction generators.

Particularly, each of the induction coils of the first group of induction coils may be assigned to different induction generators. Additionally or alternatively, each of the induction coils of the second group of induction coils may be assigned to different induction generators. In a preferred embodiment the induction cooking hob comprises at least three, at least four, at least five, at least six induction generators, wherein each induction coil of one cooking zone is connected to a dedicated induction generator. Particularly, a cooking zone may comprise four induction coils and four induction generators, wherein each induction coil is connected to one of the four dedicated induction generators.

It will be immediately understood by a person skilled in the art that an induction cooking hob according to the present invention comprises a control unit. Preferably, the control unit is for controlling the induction generators and the induction coils.

The present inventors have surprisingly found that the acoustic noise, which may occur by interference of adjacent induction coils, can be advantageously reduced when said adjacent induction coils have different working frequencies. Moreover, the present inventors have also found that the acoustic noise can be advantageously reduced by particular placements of the induction coils, particularly of the individual coils of different groups of coils.

In an embodiment, at least two induction coils of one cooking zone having the maximum distance to each other are activatable or activated at the same time by the control unit. Vice versa the activation of two adjacent induction coils at the same time by the control unit is avoided. This advantageously allows decreasing the acoustic noise.

For example, each induction coil of one cooking zone, particularly of the first and/or the second group of induction coils, may be arranged such that it has the same distance to the centre of said cooking zone. Such configuration is of particular advantage, if a coil arrangement is considered, in which the individual coils of a cooking zone are arranged in a regular matrix and/or in regular positions around a centre of a cooking zone.

Preferably, each induction coil of one cooking zone has the same distance to the centre of said cooking zone. Particularly, in an embodiment according to which the cooking zone includes at least four induction coils, each of the at least four induction coils has the same distance to the centre of said cooking zone.

Alternatively, the induction coils of one cooking zone, particularly of the first and/or the second group of induction coils, can be arranged in an array or row of induction coils. Such array or row of induction coils, may comprise at least three, at least four, preferably four, at least five or at least six induction coils. Preferably, the induction coils of the first group of induction coils are arranged alternating with the induction coils of any further group, particularly the second group, of induction coils. By way of example in such array the induction coils of the first group (a) and of the second group (b) may be arranged in an alternating manner, e.g. (a)-(b)-(a)-(b).

According to a particularly preferred embodiment of the present invention an induction cooking hob comprising at least one cooking zone is provided, wherein:
the cooking zone includes at least four induction coils,
the induction cooking hob comprises at least four induction generators,
each induction coil of one cooking zone is connected to a dedicated induction generator,
the cooking zone includes at least one control unit for controlling the induction generators and the induction coils,
each induction coil of one cooking zone has the same distance to the centre of said cooking zone,
at least two groups of at least two induction coils in each case within one cooking zone are alternatingly activatable or activated by the control unit, and
at least two induction coils of one cooking zone having the maximum distance to each other are activatable or activated at the same time by the control unit.

The power supply system, preferably is an at least two phase power supply system, more preferably a three phase power supply system. The induction coils of one cooking zone, i.e. of the first and/or the second group, may be connected to different power lines. Alternatively, the induction coils of one cooking zone, i.e. of the first and/or the second group, may be connected to the same power line.

Preferably, the at least two induction coils of one cooking zone, which are activatable or activated at the same time, are supplied by two different conductors.

Said two different conductors, preferably are conductors of a three-phase power supply system. This constellation optimises the power transferred to the cooking zone.

In other words, preferably the induction coils of one cooking zone, which are activatable or activated at the same time, are supplied by at least two different conductors of a power supply system. Particularly, the at least two induction coils of a second group of induction coils, which are activatable or activated at the same time, are supplied by at least two different conductors of a power supply system.

An advantageous arrangement, which allows reduction of acoustic noise can be achieved, if the induction coils of the first and/or the second group of induction coils, more particularly all the induction coils of the one cooking zone, may have the same sizes or different. Preferably, the induction coils of one cooking zone may have the same sizes. Particularly, the induction coils of the first and/or the second group of induction coils, more particularly all the induction coils of the one cooking zone, may have the same sizes.

Additionally or alternatively, the induction coils of the first and/or the second group of induction coils, more particularly all the induction coils of the one cooking zone, may have the same shapes. This advantageously allows a placement of induction coils in one cooking zone, which may allow reducing acoustic noise. Particularly, the induction coils of the inventive induction hob, preferably of one cooking zone, each may be selected independently and individually from circular, elliptical, squared, rectangular and triangular induction coils.

According to a preferred embodiment of the present invention, the cooking zone includes three induction coils arranged as a triangle. More preferably, the cooking zone includes three induction coils arranged as an isosceles triangle. Thereby, each coil may have the same shape and/or size. Particularly, the cooking zone may include three oval induction coils arranged as an isosceles triangle. Alternatively, the cooking zone may include three circular induction coils arranged as an isosceles triangle. Further alternatively, the cooking zone may include three triangular, preferably isosceles triangular, induction coils arranged as an isosceles triangle.

Thereby, a first group (a) of two adjacently arranged induction coils of the cooking zone are activatable or activated at the same time during a time slot, while another group (b) of one induction coil of said cooking zone is activatable or activated at the same time during a further subsequent time slot.

According to a further preferred embodiment of the present invention, the cooking zone includes at least three, particularly at least four, induction coils arranged in a row or array, preferably at equal distances. Preferably, a first group (a) of one or two respective alternately arranged induction coils of the cooking zone are activatable or activated at the same time during a time slot, while a further group (b) of two respective alternately arranged induction coils of said cooking zone are activatable or activated at the same time during a further subsequent time slot. In other words, such cooking zone includes at least four induction coils each belonging to a first group "a" or a second group "b", wherein said coils are arranged in a row or array, preferably at equal distances, in an alternating manner (e.g. a-b-a or a-b-a-b). Preferably, the sequence of activation of groups of induction coils, which are activatable or activated at the same time during a time slot, is configured such that the activation of one group of induction coils, particularly the first group, and a further activation of said group, particularly the first group, is further apart in terms of actual time.

According to the present invention, also more than two groups of induction coils may be advantageously applied, respective alternately arranged and forming said cooking zone. Thereby, all induction coils of one such group of induction coils are activatable or activated at the same time during a first or further subsequent time slot. For example, a first group (a) of induction coils of the cooking zone are activatable or activated at the same time during a first time slot, while a further group (b) of respective alternately arranged induction coils of said cooking zone are activatable or activated at the same time during a further subsequent time slot, additionally a still further group (c) of respective alternately arranged induction coils of said cooking zone are activatable or activated at the same time during a still further subsequent time slot. The arrangement and/or the sequence of activation may then be a-b-c, a-b-a-c, etc.

According to a preferred embodiment of the present invention, the cooking zone includes four induction coils arranged as a two-by-two matrix. More preferably, the cooking zone includes four induction coils arranged as a two-by-two matrix, wherein a group of two diagonally arranged induction coils of the cooking zone are activatable or activated at the same time during a time slot, while another group of two diagonally arranged induction coils of said cooking zone are activatable or activated at the same time during a further subsequent time slot.

According to a further embodiment of the present invention, the cooking zone includes at least four, preferably at least six, more preferably at least nine induction coils forming a cooking zone. Preferably, the cooking zone includes six, particularly triangular, induction coils forming a hexagonal cooking zone. Particularly, in such configuration one acute angle of each triangular induction coil may be arranged in the centre of said cooking zone, and a group of two opposing induction coils of the cooking zone may be activatable or activated at the same time during a time slot, while the other groups of opposing induction coils of said cooking zone are activatable or activated at the same time during a further subsequent time slot in each case.

According to another embodiment of the present invention, the cooking zone includes nine, particularly, triangular induction coils forming a cooking zone, wherein one acute angle of each, particularly triangular, induction coil is arranged in the centre of said cooking zone, and wherein a group of three star-shaped induction coils of the cooking zone is activatable or activated at the same time during a time slot, while the other groups of three star-shaped induction coils of said cooking zone are activatable or activated at the same time during further subsequent time slots in each case.

Preferably, the three star-shaped induction coils activatable or activated at the same time are supplied by three different conductors of the three-phase power supply system. This allows the use of all three conductors of the three-phase power supply system.

For example, the cooking zone is provided for a pan, in particular a paella pan, or for any other cooking vessel having a large diameter.

The above described problems are also advantageously solved by a method for controlling a cooking zone of an induction cooking hob as disclosed herein. Said method comprises at least the following steps:
a step a) of activating a first group (a) of induction coils of a cooking zone during a first time slot,
a step b) of activating a second group (b) of induction coils of the cooking zone during a subsequent second time slot.

In an embodiment of the method according to the present invention the method further comprises a step c) of activating a third group c) of induction coils of the cooking zone during a further subsequent second time slot.

Preferably, a sequence of activation of groups of induction coils, which are activatable or activated at the same time during a time slot, is configured such that the activation of one group of induction coils, particularly the first group, and a further activation of said group, particularly the first group, is further apart in terms of actual time. Particularly, the sequence of steps a) and step b), and optionally c) are consecutively repeated. For example, the length of each time slot is between one second and three seconds, in particular two seconds.

In an embodiment, the induction coils activated during the same time slot of one cooking zone, which are activatable or activated at the same time, are supplied by at least two different conductors of a power supply system. In a preferred embodiment of the method according to the present invention the at two induction coils activated during the same time slot are supplied by different conductors of a three-phase power supply system.

The present invention will be described in further detail with reference to the drawings from which further features, embodiments and advantages may be taken, and in which:

FIG. 1 illustrates a schematic top view of a cooking zone of an induction cooking hob according to a preferred embodiment of the present invention, FIG. 2 illustrates a schematic top view of the cooking zone of the induction cooking hob according to a further embodiment of the present invention, and FIG. 3 illustrates a schematic top view of the cooking zone of the induction cooking hob according to another embodiment of the present invention.

FIGS. 6A to 6B illustrate schematic top views of the cooking zone of the induction cooking hob according to other embodiments of the present invention.

In the embodiments shown in the figures, elements similar or identic in function are designated with like reference signs. It is noted, that the figures may not be true to scale with respect to each other.

Figure 1:
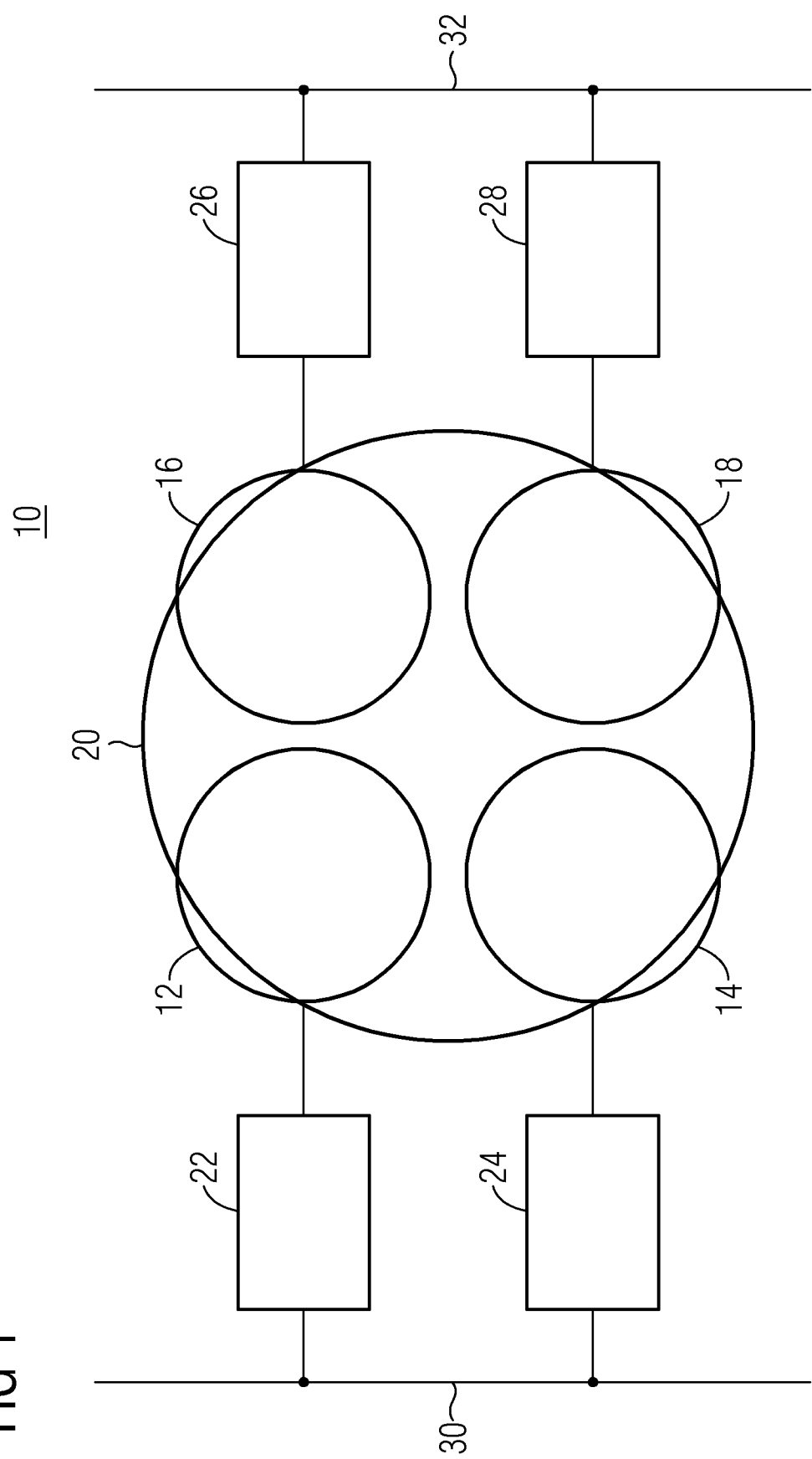

FIG. 1 illustrates a schematic top view of a cooking zone 20 of an induction cooking hob 10 according to a preferred embodiment of the present invention. Such induction cooking hob 10 according to the present invention comprises a control unit and at least one cooking zone 20. A schematic cooking zone 20 is shown in FIG. 1, and according to this embodiment comprises four induction coils 12, 14, 16 and 18. Each induction coil 12, 14, 16 and 18 is connected to a corresponding induction generator 22, 24, 26 and 28.

In this example, the four induction coils 12, 14, 16 and 18 of the cooking zone 20 of the induction cooking hob 10 are arranged as a two-by-two matrix. A first induction coil 12 is arranged on the rear left hand side of the cooking zone 20 of the induction cooking hob 10. A second induction coil 14 is arranged on the font left hand side of the cooking zone 20 of the induction cooking hob 10. A third induction coil 16 is arranged on the rear right hand side of the cooking zone 20 of the induction cooking hob 10. A fourth induction coil 18 is arranged on the front right hand side of the cooking zone 20 of the induction cooking hob 10. In this example, a pan is placed above the four induction coils 12, 14, 16 and 18 of the cooking zone 20. For example, the pan is a paella pan.

A first induction generator 22 is connected to the first induction coil 12. In a similar way, a second induction generator 24 is connected to the second induction coil 14. Further, a third induction generator 26 is connected to the third induction coil 16. Moreover, a fourth induction generator 28 is connected to the fourth induction coil 28. The first induction generator 22 and the second induction generator 24 are connected to a first conductor 30. The third induction generator 26 and the fourth induction generator 28 are connected to a second conductor 32. The first conductor 30 and the second conductor 32 are different lines of a three-phase power supply system.

The induction cooking hob 10 comprises at least one control unit, which is not shown in FIG. 1. The control unit is provided for activating and deactivating each of the induction generators 22, 24, 26 and 28. Further, the control unit is provided for setting or adjusting the working frequency of each induction generators 22, 24, 26 and 28. The working frequency of the induction generators 22, 24, 26 and 28 is adjustable within a predefined range. For example, said predefined range of the working frequency is between 20 kHz and 50 kHz. The working frequency of the induction generators 22, 24, 26 and 28 is adjusted according to a power requested by the user.

In the shown embodiment a first group a) of two induction coils (12, 18), and at least one second group b) of two or more induction coils (14, 16) of said at least one cooking zone (20) are alternatingly activatable or activated by the control unit A first group a) of two diagonally arranged induction coils 12 and 18 and a second group b) of induction coils 14 and 16 of the cooking zone 20 are alternatingly activatable or activated by the control unit. Thereby, the induction coils 12 and 18 of group a) and the induction coils 14 and 16 of the second group b) are activated at the same time, while the other diagonally arranged induction coils of group b) 14 and 16 or group a) 12 and 18 of said cooking zone 20 are deactivated, respectively.

During a first time slot the group a), i.e. the first induction coil 12 and the fourth induction coil 18, are activated. The first induction coil 12 and the fourth induction coil 18 are arranged diagonally to each other within the cooking zone 20. The first induction coil 12 has the maximum distance to the fourth induction coil 18 within the cooking zone 20. The first induction coil 12 is supplied by the first conductor 30, while the fourth induction coil 18 is supplied by the second conductor 32.

During a second time slot the second group b) of the second induction coil 14 and the third induction coil 16 are activated. The second induction coil 14 and the third induction coil 16 are arranged diagonally to each other within the cooking zone 20, so that the second induction coil 14 has the maximum distance to the third induction coil 16 within the cooking zone 20. The second induction coil 14 is supplied by the first conductor 30, while the third induction coil 16 is supplied by the second conductor 32.

The first time slot and the second time slot are repeated again and again. The activation of these induction coils 16 having the maximum distance to each other avoids the occurrence of acoustic noise.

Figure 2:
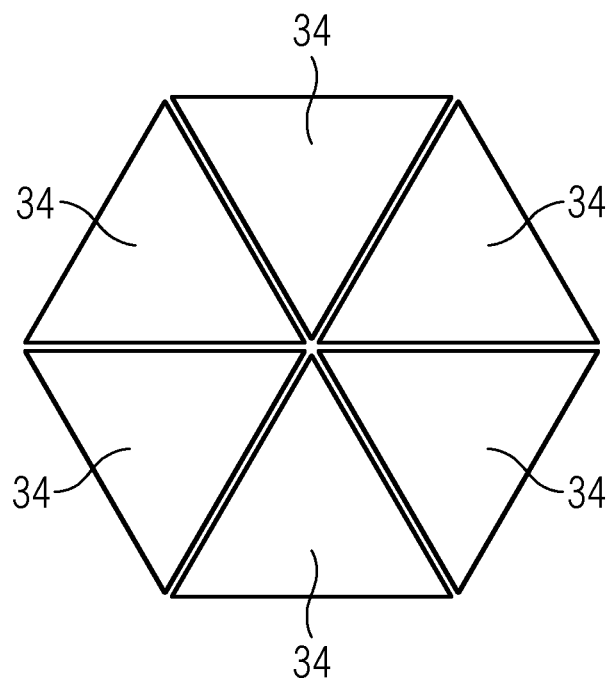

FIG. 2 illustrates a schematic top view of the cooking zone 20 of the induction cooking hob 10 according to a further embodiment of the present invention.

In the further embodiment the cooking zone 20 includes six triangular induction coils 34 forming a hexagonal cooking zone 20. One acute angle of each triangular induction coil 34 is arranged in or close to the centre of said cooking zone 20. Two opposing induction coils 34 have the maximum distance to each other.

In such configuration the induction cooking hob can be configured such that three groups, i.e. pairs a), b) and c) of opposing induction coils 34 are alternatingly activated. At the same time only the opposing induction coils 34 are activated, so that the occurrence of acoustic noise is avoided. The opposing induction coils 34 are supplied by the different conductors 30 and 32. Three subsequent time slots are repeated again and again.

Alternatively, in such configuration the induction cooking hob can be configured such that only two groups, i.e. a') and, b') of induction coils 34 are alternatingly activated. At the same time only the induction coils 34 of one of the groups a' or b' are activated, so that the occurrence of acoustic noise is avoided. The induction coils 34 of the respective other group a' or b', respectively, are supplied by the different conductors 30 and 32. Three subsequent time slots are repeated again and again.

Figure 3:
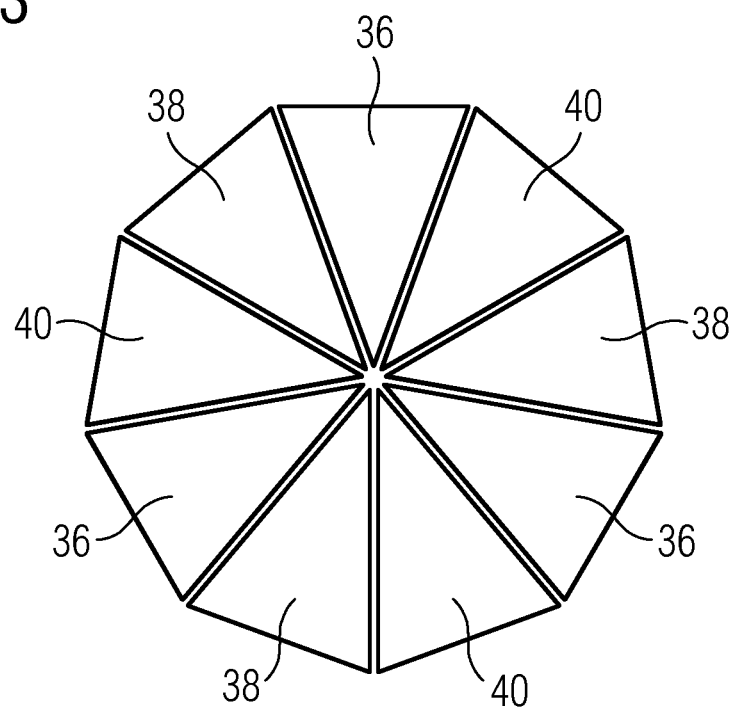

FIG. 3 illustrates a schematic top view of the cooking zone 20 of the induction cooking 10 hob according to another embodiment of the present invention.

In this embodiment, the cooking zone 20 includes nine triangular induction coils 36, 38 and 40 forming a cooking zone 20. One acute angle of each triangular induction coil is arranged in or close to the centre of said cooking zone 20. A first group of three star-shaped induction coils 36 are activatable or activated at the same time during the first time slot. In a similar way, a second group of three star-shaped induction coils 38 are activatable or activated at the same time during the second time slot. At last, a third group of three star-shaped induction coils 40 are activatable or activated at the same time during a third time slot. The three star-shaped induction coils 36, 38 or 40, respectively, have the maximum distance to each other within the cooking zone 20. The three star-shaped induction coils 36, 38 or 40 activated at the same time are supplied by three different conductors of the three-phase power supply system. In this embodiment, all three conductors of the three-phase power supply system are used.

Figure 4B:
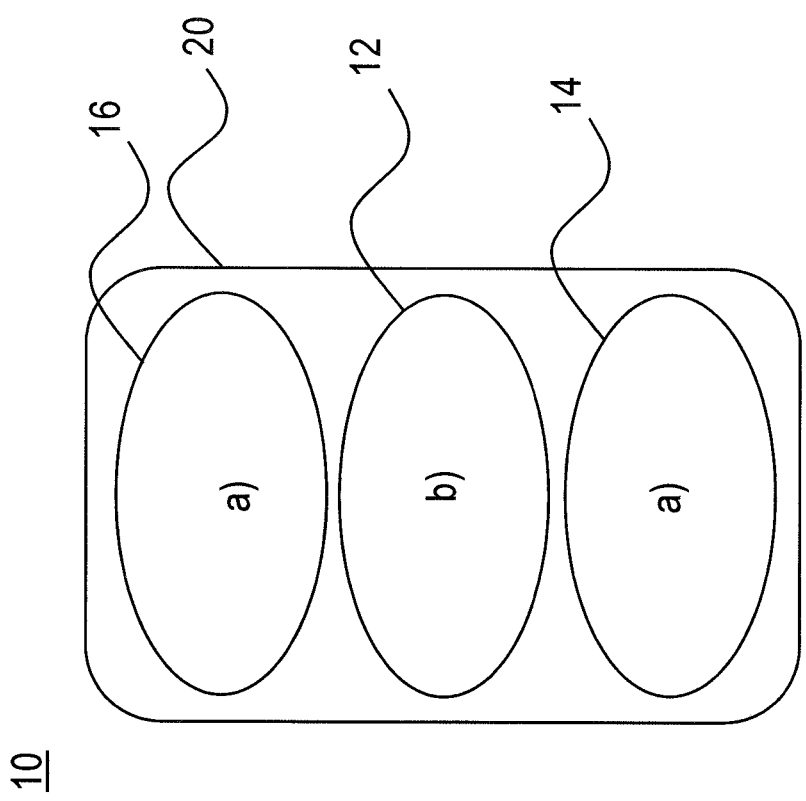
FIGS. 4A to 4B illustrate schematic top views of the cooking zone of the induction cooking hob according to other embodiments of the present invention.
Figure 4A:
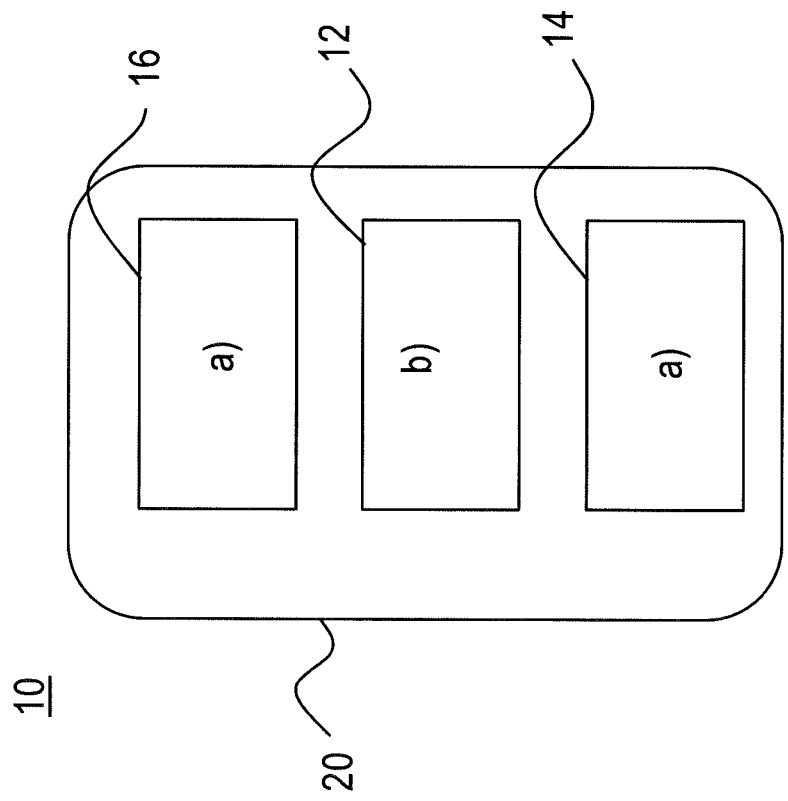

FIGS. 4A and 4B illustrate a schematic top view of cooking zones 20 of an induction cooking hob 10 according to other preferred embodiments of the present invention. Such induction cooking hobs 10 according to the present invention comprise a control unit and at least one cooking zone 20. Schematic cooking zones 20 are shown in FIG. 4A and FIG. 4B, and according to these embodiments comprise three induction coils 12, 14 and 16. Each induction coil 12, 14, and 16 is connected to a corresponding not shown induction generator.

In this example, the three induction coils 12, 14, and 16 of the cooking zone 20 of the induction cooking hob 10 are arranged in a column, row or array, and are either rectangular (see FIG. 4A) or oval (FIG. 4B) shaped. Particularly, all the induction coils 12, 14, and 16 of said cooking zone are arranged in an array, column or row at equal or different distances, but with regard to their grouping in an alternating manner (a-b-a), or subsequent manner a-b-c.

A first induction coil 16 is arranged on the top or left of the cooking zone 20 of the induction cooking hob 10. A second induction coil 12 is arranged in the middle of the cooking zone 20 of the induction cooking hob 10. A third induction coil 14 is arranged at the lower or right end of the cooking zone 20 of the induction cooking hob 10. In this example, a large longish pan can be advantageously placed above the three induction coils 12, 14, and 16 of the cooking zone 20. For example, the pan is a plancha pan.

A first induction generator 22 as shown in FIG. 1 is connected to the induction coil 12. In a similar way, a second induction generator 24 as shown in FIG. 1 is connected to the induction coil 14 in FIG. 4A and FIG. 4B. Further, a third induction generator 26 as shown in FIG. 1 is connected to the induction coil 16. The first induction generator 22 and the second induction generator 24 may be connected to the same, especially first, conductor 30 as shown in FIG. 1. The third induction generator 26 may be connected to a second conductor 32 as also shown in FIG. 1. The first conductor 30 and the second conductor 32 can be the same, or preferably different lines, of a two-phase or three-phase power supply system. The first conductor 30 and the second conductor 32 can also be the same lines, of a one-phase phase power supply system.

The generators 22, 24, 26, 28 can comprise one, at least one, at least two or two IGBTs (insulated-gate bipolar transistors). The IGBTs can operate in a half-bridge or as a quasi-resonant circuit.

The induction cooking hob 10 comprises at least one control unit, which is not shown in FIG. 4A and FIG. 4B. The control unit is provided for activating and deactivating each of the induction generators 22, 24, and 26 as shown in FIG. 1. Further, the control unit is provided for setting or adjusting the working frequency of each induction generators 22, 24, and 26. The working frequency of the induction generators 22, 24, and 26 is adjustable within a predefined range. For example, said predefined range of the working frequency is between 20 kHz and 50 kHz. The working frequency of the induction generators 22, 24, 26 and 28 is adjusted according to a power requested by the user.

In the shown embodiments, a first group a) of two induction coils 16 and 14, and one second group b) of induction coil 12 of said at least one cooking zone 20 are alternatingly activatable or activated by the control unit.

A first group a) of induction coils 16 and 14 and a second group b) of induction coil 23 of the cooking zone 20 in FIG. 4A and FIG. 4B are alternatingly activatable or activated by the control unit. Thereby, the induction coils 16 and 14 of the first group a) or the induction coil 12 of the second group b) are activated at the same time, while the other induction coils of group b) 12 or group a) 16 and 14 of said cooking zone 20 are deactivated, respectively.

Accordingly, the sequence of activation of groups of induction coils, which are activatable or activated at the same time during a time slot, is configured such that the activation of one group of induction coils, particularly the first group, and a further activation of said group, particularly the first group, is further apart in terms of actual time.

During a first time slot the group a), i.e. the induction coil 16 and the induction coil 14, are activated. The induction coil 12, the induction coil 16 and the induction coil 14 are arranged such that the induction coil 16 has the maximum distance to the induction coil 14 within the cooking zone 20. The induction coils 12 and 14 may be supplied by a first conductor 30, while the induction coil 16 is supplied by the second conductor 32, as shown in FIG. 1.

During a second time slot, the second group b) of the induction coil 12 is activated. The induction coil 16 is supplied by the second conductor 32, as shown in FIG. 1.

The first time slot and the second time slot are repeated again and again. The activation of these induction coils 16 and 14 having the maximum distance to each other avoids the occurrence of acoustic noise.

Alternatively, the induction coils of one cooking zone, particularly of the first and/or the second group of induction coils, can be arranged in an array or row of induction coils. Such an array, column or row of induction coils may comprise at least three, at least four, preferably four, at least five or at least six induction coils. Preferably, the induction coils of the first group of induction coils are arranged alternating with the induction coils of any further group, particularly the second group, of induction coils. By way of example, in such an array the induction coils of the first group (a) and of the second group (b) may be arranged in an alternating manner, e.g. (a)-(b)-(a)-(b).

Figure 5C:
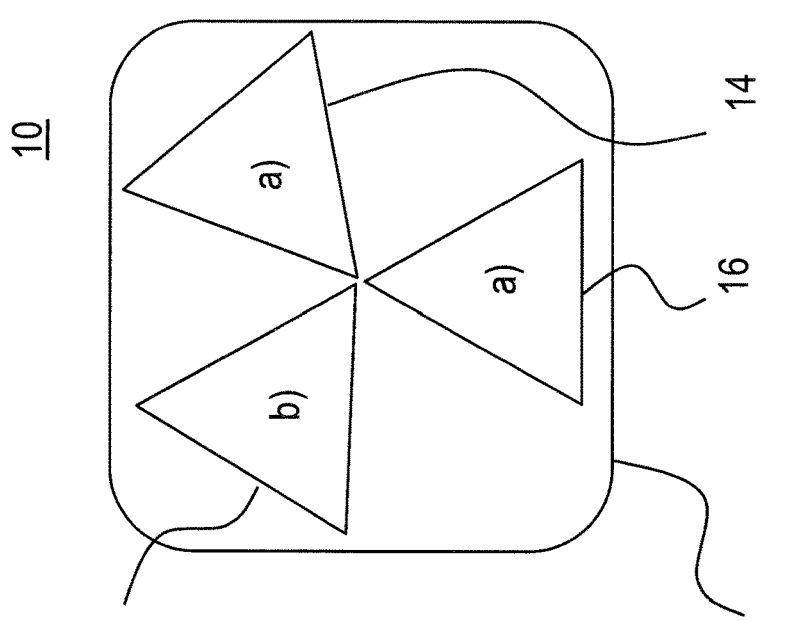
FIGS. 5A to 5C illustrate schematic top views of the cooking zone of the induction cooking hob according to other embodiments of the present invention.
Figure 5B:
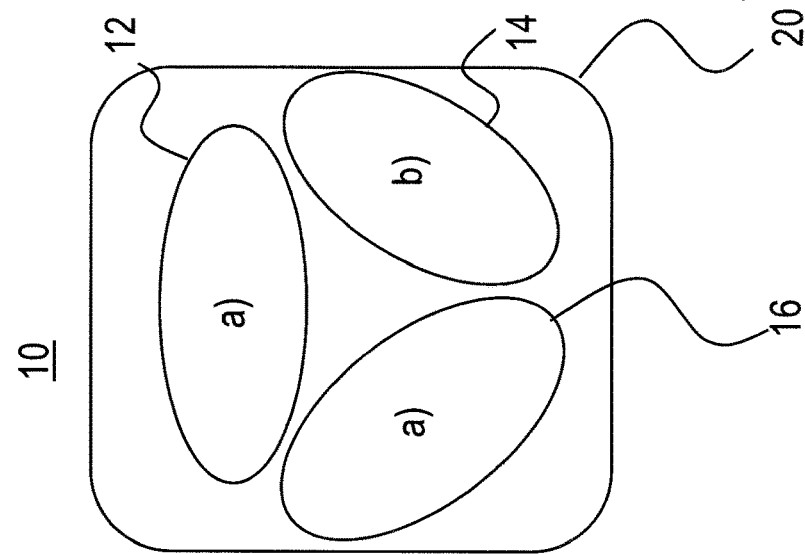
Figure 5A:
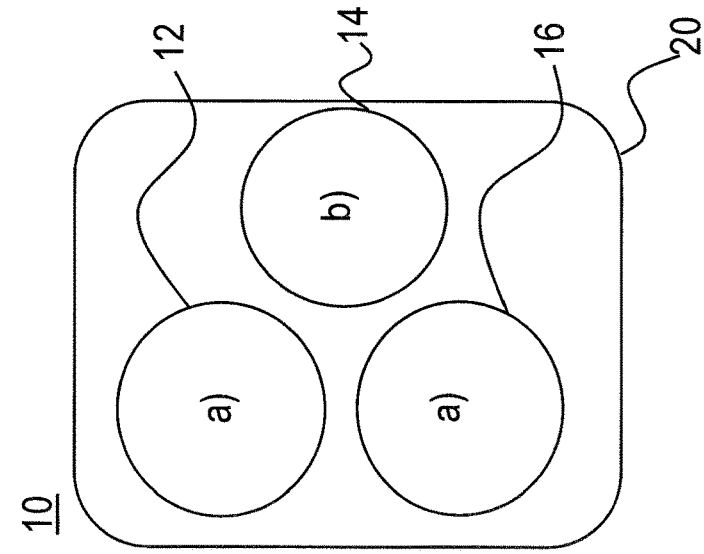

FIGS. 5A, 5B and 5C illustrate schematic top views of a cooking zone 20 of an induction cooking hob 10 according to other preferred embodiments of the present invention. Said embodiments differ from the embodiments shown in FIG. 4A and FIG. 4B in that the schematic cooking zone 20 shown in FIGS. 5A, 5B and 5C comprises three induction coils 12, 14 and 16, being arranged as an isosceles triangle. Thereby, each coil of each embodiment has the same shape and size. However, a person skilled in the art may recognize that for the coils, different shapes and/or sizes may be applied as well. Particularly, as shown in FIG. 5B, the cooking zone may include three oval induction coils arranged as an isosceles triangle. Alternatively, as shown in FIG. 5A, the cooking zone may include three circular induction coils arranged as an isosceles triangle. Further alternatively, as shown in FIG. 5C, the cooking zone may include three triangular, preferably isosceles triangular, induction coils arranged as an isosceles triangle. Various combinations of shape, size and/or arrangement can advantageously provide a cooking hob having reduced acoustic noise and being in the scope of the present invention.

Figure 7B:
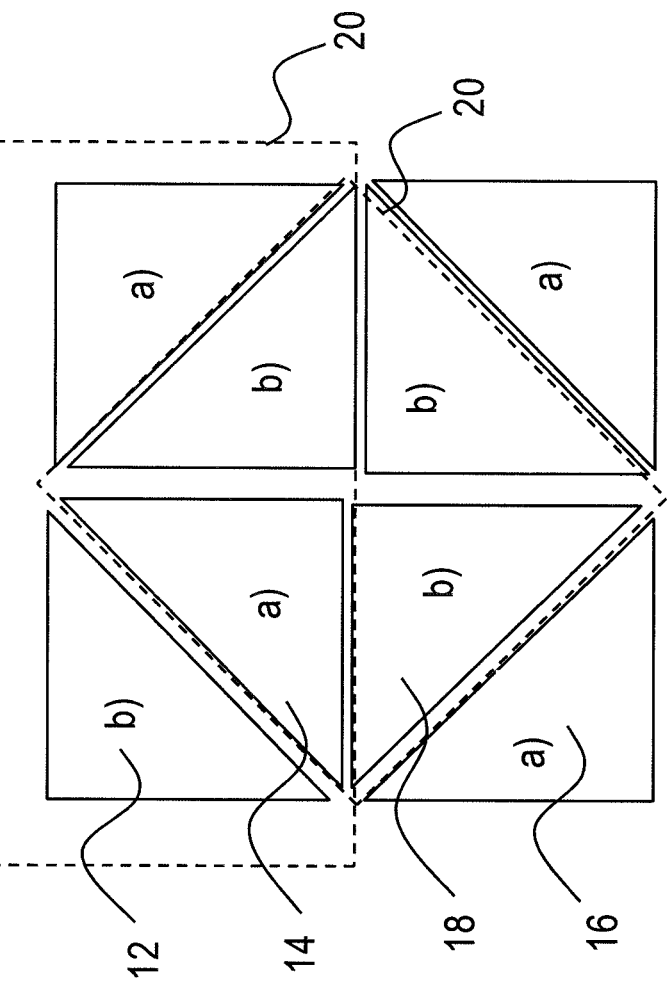
FIGS. 7A to 7B illustrate schematic top views of the cooking zone of the induction cooking hob according to other embodiments of the present invention.
Figure 7A:
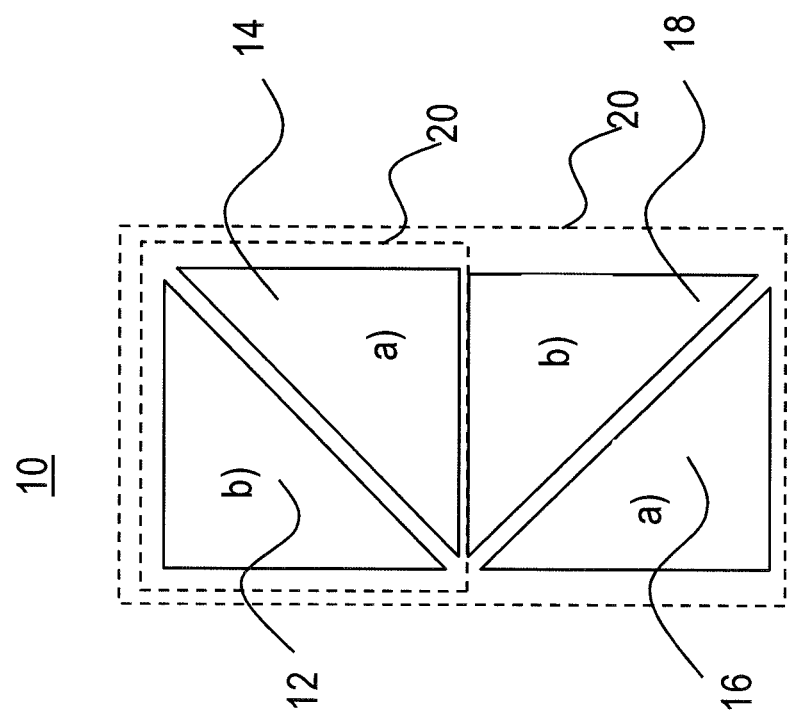

For triangular coils 12, 14, 16, 18 in FIGS. 7A and 7B, for example, also right triangles are possible. For triangular coils, for example, also arrangements of particularly right triangles are possible, wherein two triangles together have an outer shape of a square, essentially a square or a rectangle.

As shown in FIG. 7A, four triangles of triangular coils 12, 14, 16, 18 can be used which complement each other to a rectangle.

As shown in FIG. 7B, eight or at least eight triangles of triangular coils can be combined, wherein eight triangles complement each other to a square. Preferably, eight triangles complement each other to a larger outer square and a smaller inner square and/or four small squares. The outer and the inner square can be rotated to each other by 45°. Preferably, at least one cooking zone 20 combines the triangles to at least one small square and/or the smaller square and/or the outer square.

In addition, a not shown concentric arrangement of the three coils is possible.

Particularly, as shown in FIGS. 6A, 6B and 7A and 7B, the underlying idea of the present invention can be easily extended to different cooking zones 20 (which are exemplarily represented as dotted lines), including more than three induction coils (12, 14, 16, 18), more than three coils, and particularly on cooking hobs in which the coils are arranged as matrices. In the embodiments shown in FIG. 6 and FIG. 7, the coils are arranged in a row, column or array, and particularly, regarding the embodiments shown in FIG. 6B and FIG. 7B, several of such columns or rows may be arranged adjacent to each other. The coils in the shown embodiments of FIG. 6 and FIG. 7 are either rectangular (see FIGS. 6A and 6B) or triangular (FIGS. 7A and 7B) shaped. Particularly, all the induction coils 12, 14, and 16 of said cooking zone are arranged in an array, column or row at equal distances, but with regard to their grouping in an alternating manner (a-b-a), or subsequent manner a-b-c.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The features of the present invention disclosed in the specification, the claims, examples and/or the figures may both separately and in any combination thereof be material for realizing the invention in various forms thereof.

LIST OF REFERENCE NUMERALS 10 induction cooking hob
12 first induction coil
14 second induction coil
16 third induction coil
18 fourth induction coil
20 cooking zone
22 first induction generator
24 second induction generator
26 third induction generator
28 fourth induction generator
30 first conductor
32 second conductor
34 triangular induction coil
36 triangular induction coil
38 triangular induction coil
40 triangular induction coil
a) first group
b) second group

The invention claimed is:

1. An induction cooking hob comprising a controller and a cooking zone, wherein the cooking zone includes at least three induction coils, wherein a first group of one or more of said induction coils, and a second group of two or more of said induction coils of said cooking zone are alternatingly activatable or activated by the controller, and
wherein no two of said induction coils which are arranged adjacent to each other are activatable at the same time.

2. The induction-cooking hob according to claim 1, wherein the induction coils are arranged as a two-dimensional matrix extending along two directions and comprising a plurality of groups comprising said first group and said second group of said induction coils, wherein along each of the two directions of the matrix the induction coils of the different groups are arranged in an alternating manner such that an induction coil of a specific group is surrounded by induction coils of another group or other groups only, and wherein the groups of induction coils are alternatingly activatable or activated.

3. The induction-cooking hob according to claim 1, wherein the cooking zone includes four induction coils arranged as a two-by-two matrix, said first group comprising two diagonally arranged induction coils of said four induction coils and said second group comprising two other diagonally arranged induction coils of said four induction coils, wherein the first group of induction coils and the second group of induction coils are alternatingly activatable or activated.

4. The induction-cooking hob according to claim 1, wherein the induction coils which are activatable or activated at the same time are arranged to have a maximum distance to each other.

5. The induction-cooking hob according to claim 1, wherein the induction coils of the second group of induction coils are activatable or activated at the same time by the controller.

6. The induction-cooking hob according to claim 1, wherein the first group of induction coils comprises more than one induction coil, wherein the induction coils of the first group of induction coils are activatable or activated at the same time by the controller.

7. The induction-cooking hob according to claim 1, wherein each of the induction coils of the cooking zone is assigned to a different induction generator.

8. The induction-cooking hob according to claim 1, wherein each induction coil of the cooking zone has the same distance to a centre of said cooking zone.

9. The induction cooking hob according to claim 1, wherein the induction coils of said cooking zone are arranged in an array or a row of induction coils, wherein the induction coils of the first group of induction coils are arranged alternating with the induction coils of the second group of induction coils.

10. The induction cooking hob according to claim 1 comprising at least one of the following features:
   a) the induction coils of the cooking zone of the induction cooking hob are arranged in at least one of a column, row or array,
   b) wherein the induction coils are rectangular or oval shaped,
   c) the column, the array or the row of said induction coils comprises at least four induction coils,
   d) the induction coils are triangular shaped,
   e) three of said induction coils are arranged as an isosceles triangle,
   f) at least three of said induction coils are arranged concentrically,
   g) each said induction coil has the same shape and size or the induction coils have at least one of different shapes or different sizes,
   h) the cooking zone includes three oval induction coils arranged as an isosceles triangle,
   i) the cooking zone includes three circular induction coils arranged as the isosceles triangle,
   j) the cooking zone includes three triangular induction coils arranged as the isosceles triangle,
   k) the induction cooking hob comprises at least four triangular shaped induction coils forming triangles,
   l) two triangular shaped induction coils complement each other to a square,
   m) four triangular shaped induction coils complement each other to a rectangle,
   n) eight triangular shaped induction coils complement each other to at least one square,
   o) eight triangular shaped induction coils complement each other to a larger outer square and at least one of a smaller inner square or four small squares, wherein the outer and the inner squares, respectively, are rotated relative to each other by 45°,
   p) triangular induction coils of the cooking hob are combined to at least one of a smaller square or an outer square to form the cooking zone,
   q) the induction cooking hob comprises at least one generator comprising at least one IGBT (insulated-gate bipolar transistors), and
   r) IGBTs present in one or more generators of said induction cooking hob operate as at least one of a full-bridge, a half-bridge or as a quasi-resonant circuit.

11. The induction cooking hob according to claim 1, wherein the induction coils of said cooking zone, which are activatable or activated at the same time, are supplied by at least two different conductors of a power supply system.

12. The induction cooking hob according to claim 1, wherein the induction coils of at least one of the first or the second group of induction coils have the same sizes.

13. The induction cooking hob according to claim 1, wherein the induction coils of at least one of the first or the second group of induction coils have the same shapes.

14. The induction cooking hob according to claim 1, wherein the cooking zone is provided for a paella pan or for any other cooking vessel having a large diameter.

15. The induction cooking hob according to claim 1, said first group of induction coils being arranged rotationally symmetrically within and about a center of said cooking zone, and said second group of induction coils also being arranged rotationally symmetrically within and about said center of said cooking zone, wherein the coils of said first group are arranged in a rotationally alternating pattern with respect to the coils of said second group about said cooking zone such that no two coils of the same group are disposed rotationally adjacent to one another.

16. A method for controlling the cooking zone of the induction cooking hob according to claim 1, wherein the method comprises the steps of:
   a) activating the first group of induction coils of the cooking zone during a first time slot,
   b) activating the second group of induction coils of the cooking zone during a subsequent second time slot.

17. The method according to claim 16, wherein the induction coils are arranged as a two-dimensional matrix extending along two directions, said induction coils comprising a plurality of groups comprising said first group of induction coils and said second group of induction coils, wherein along each of the two directions of the two-dimensional matrix the induction coils of the different groups are arranged in an alternating manner such that an induction coil of a specific group is surrounded by induction coils of another group or other groups only, and wherein the groups of induction coils are alternatingly activated.

18. The method according to claim 16, wherein the cooking zone includes four induction coils arranged as a two-by-two matrix, said first group comprising two diagonally arranged induction coils of said four induction coils and said second group comprising two other diagonally arranged induction coils of said four induction coils, wherein the first group of induction coils and the second group of induction coils are alternatingly activated.

19. The method according to claim 16, wherein the induction coils which are activatable or activated at the same time are arranged to have a maximum distance to each other.

20. The method according to claim 16, wherein induction coils which are arranged adjacent to each other are not activatable or activated at the same time.

21. The method according to claim 16, wherein the sequence of steps a) and step b) is consecutively repeated.

22. The method according to claim 16, wherein the induction coils which are activatable or activated at the same time are supplied by at least two different conductors of a power supply system.

23. The method according to claim 16, wherein a length of each said time slot is between one second and three seconds.

24. An induction cooking hob comprising a first group of induction coils and a second group of induction coils that collectively define a common cooking zone, a controller operatively coupled to said first and second groups of induction coils via one or more generators and adapted to operate said groups according to a predetermined cycle to cook food within a cooking vessel disposed over the first and second groups of induction coils in said cooking zone, said first group of induction coils being activated or activatable during a first time period of said predetermined cycle during which said second group of induction coils is not activated and said second group of induction coils being activated or activatable during a second time period of said predetermined cycle during which said first group of induction coils is not activated, said controller being further adapted to repeat said predetermined cycle thereby successively activating said first and said second groups of induction coils only during the respective first and second time periods, successively, during which only the respective first or second group of induction coils is activated or activatable,
   wherein no two of said induction coils which are arranged adjacent to each other are activatable at the same time.

25. The induction cooking hob according to claim 24, wherein individual ones of the induction coils within said first groups are supplied by respective, different conductors of a power-supply system, and individual ones of the induction coils within said second group are supplied by respective, different conductors of said power-supply system, each said induction coil in both said first and second groups being activated by a respectively dedicated generator controlled by said controller, wherein individual induction coils in the first group are spaced a maximum distance from one another relative to all of the induction coils in said cooking zone including both said first and said second groups thereof.

* * * * *